US012195309B2

(12) United States Patent
Tanii

(10) Patent No.: US 12,195,309 B2

(45) Date of Patent: Jan. 14, 2025

(54) CONTROLLER, BOOM DEVICE, AND CRANE VEHICLE

(71) Applicant: TADANO LTD., Kagawa (JP)

(72) Inventor: Satoshi Tanii, Kagawa (JP)

(73) Assignee: TADANO LTD., Kagawa (JP)

( * ) Notice: Subject to any disclaimer, the term of this patent is extended or adjusted under 35 U.S.C. 154(b) by 422 days.

(21) Appl. No.: 17/630,310

(22) PCT Filed: Jul. 8, 2020

(86) PCT No.: PCT/JP2020/026750

§ 371 (c)(1),
(2) Date: Jan. 26, 2022

(87) PCT Pub. No.: WO2021/020060

PCT Pub. Date: Feb. 4, 2021

(65) Prior Publication Data

US 2022/0219953 A1 Jul. 14, 2022

(30) Foreign Application Priority Data

Jul. 30, 2019 (JP) ................................ 2019-139872

(51) Int. Cl.
*G05D 1/00* (2024.01)
*B66C 23/26* (2006.01)
*B66C 23/82* (2006.01)

(52) U.S. Cl.
CPC .............. *B66C 23/82* (2013.01); *B66C 23/26* (2013.01)

(58) Field of Classification Search
CPC ...................................................... B66C 23/82
See application file for complete search history.

(56) References Cited

U.S. PATENT DOCUMENTS 4,309,023 A * 1/1982 Plumettaz .............. B66D 1/741 182/36
2013/0193391 A1* 8/2013 Fok .......................... B66D 1/38 254/266

(Continued)

FOREIGN PATENT DOCUMENTS

CN 109279511 A 1/2019
EP 0812797 A1 12/1997

(Continued)

OTHER PUBLICATIONS

Office Action issued in Indian Pat. Appl. No. 202227004216, dated Apr. 17, 2023.

(Continued)

*Primary Examiner* — Aryan E Weisenfeld
*Assistant Examiner* — Paul W Arellano
(74) *Attorney, Agent, or Firm* — MARSHALL, GERSTEIN & BORUN LLP

(57) ABSTRACT

Provided is a controller with high versatility that can automatically store or raise a boom and can be commonly used for various boom devices. The controller generates a function based on a length of a boom and a distance from a derrick fulcrum of the boom to an engaging member stored in a memory, and a depression angle of the engaging member with respect to the fulcrum. Then, the controller substitutes a derrick angle of the boom detected by a derrick angle sensor into the generated function to calculate a displacement distance from a distal end of the boom to the engaging member. The controller rotates a winch while raising and lowering the boom between a lowered position and a raised position such that the calculated displacement distance is a distance corresponding to an unwinding length of a wire detected by a length sensor.

11 Claims, 7 Drawing Sheets

(56) References Cited

U.S. PATENT DOCUMENTS

| | | | | |
|---|---|---|---|---|
| 2015/0066312 | A1* | 3/2015 | Sakuda | E02F 3/435 701/50 |
| 2016/0306059 | A1* | 10/2016 | Davies | G01V 1/3843 |
| 2018/0266337 | A1* | 9/2018 | Ikiyama | B66C 23/42 |
| 2019/0031474 | A1 | 1/2019 | Stilborn et al. | |
| 2019/0062145 | A1* | 2/2019 | Waguespack | B63B 27/34 |

FOREIGN PATENT DOCUMENTS

| | | | | |
|---|---|---|---|---|
| JP | H07-172775 | A | 7/1995 | |
| JP | H08127491 | A | 5/1996 | |
| JP | 3350251 | B2 | 11/2002 | |
| JP | 3209342 | U | 3/2017 | |
| JP | WO2019139105 | A1 | 1/2021 | |
| WO | WO-9626883 | A1 * | 9/1996 | B66C 13/20 |

OTHER PUBLICATIONS

International Preliminary Report on Patentability issued in PCT Patent Application No. PCT/JP2020/026750 mailed on Feb. 10, 2022.

International Search Report issued in PCT Patent Application No. PCT/JP2020/026750 dated Sep. 15, 2020.

Extended European Search Report issued in European Pat. Appl. No. 20848633.2, dated Jun. 29, 2023.

* cited by examiner

[Figure 1]
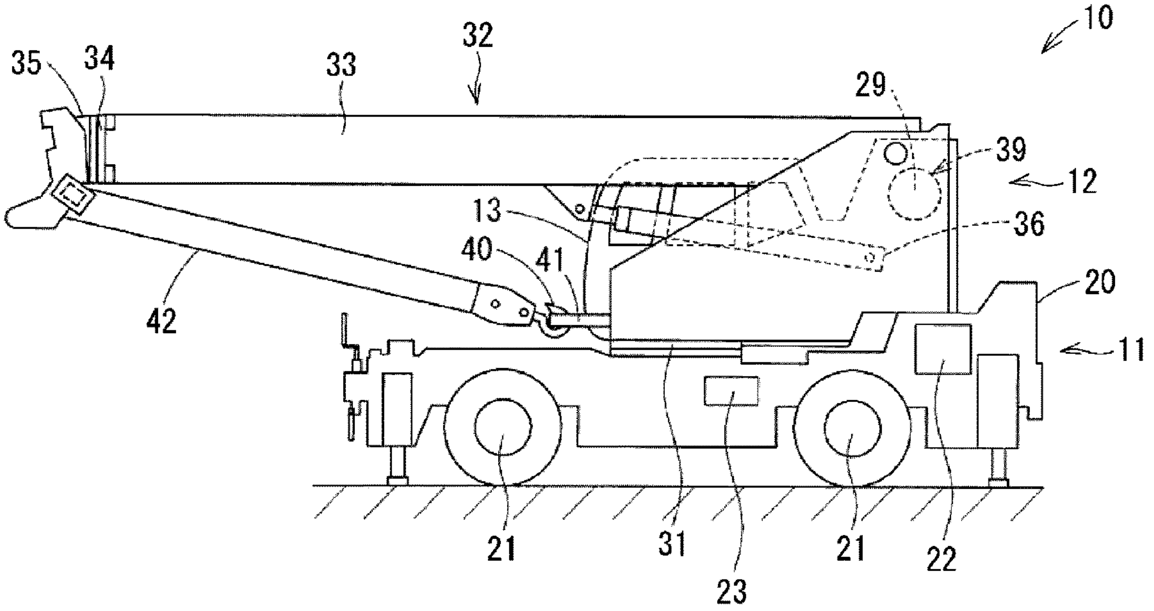

[Figure 2]
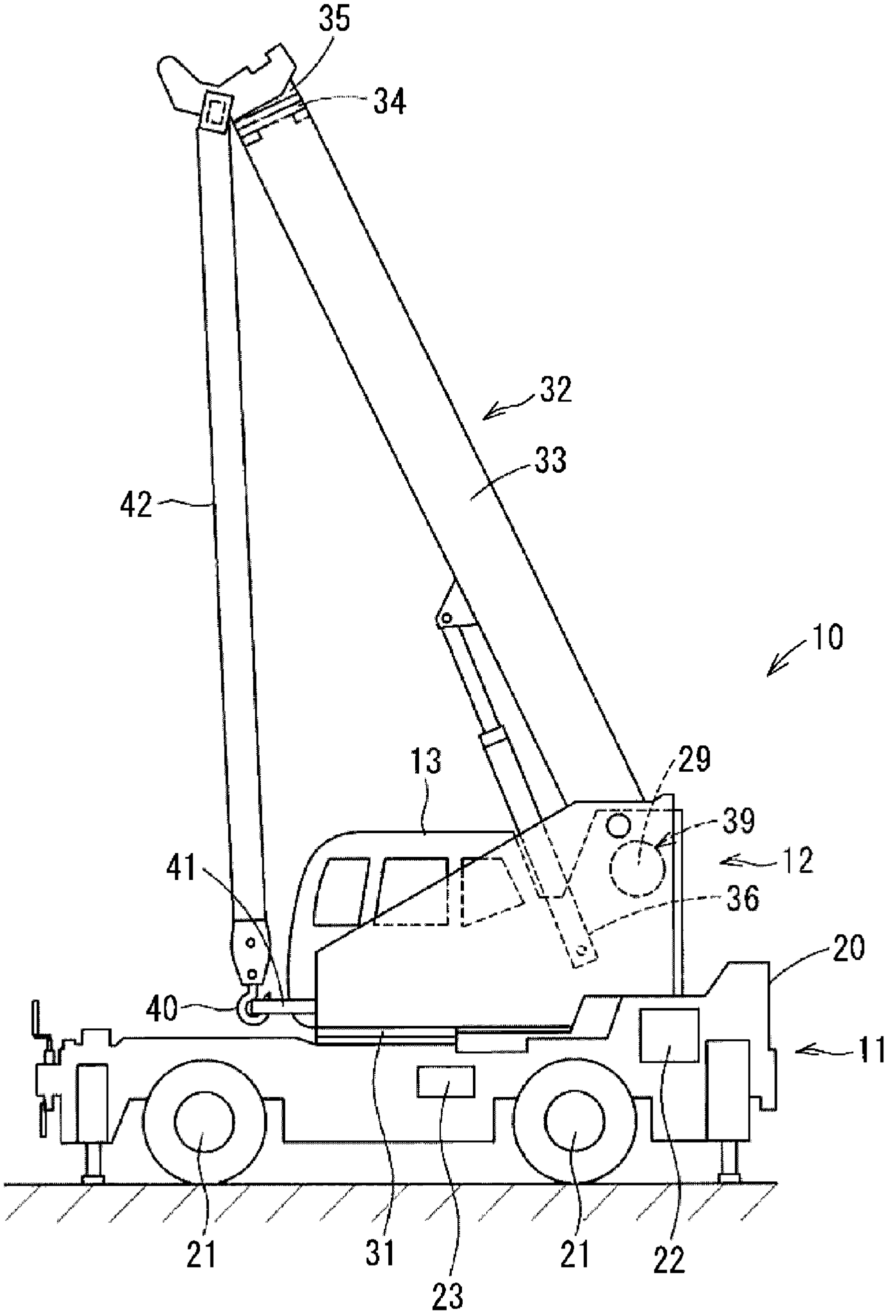

[Figure 3]
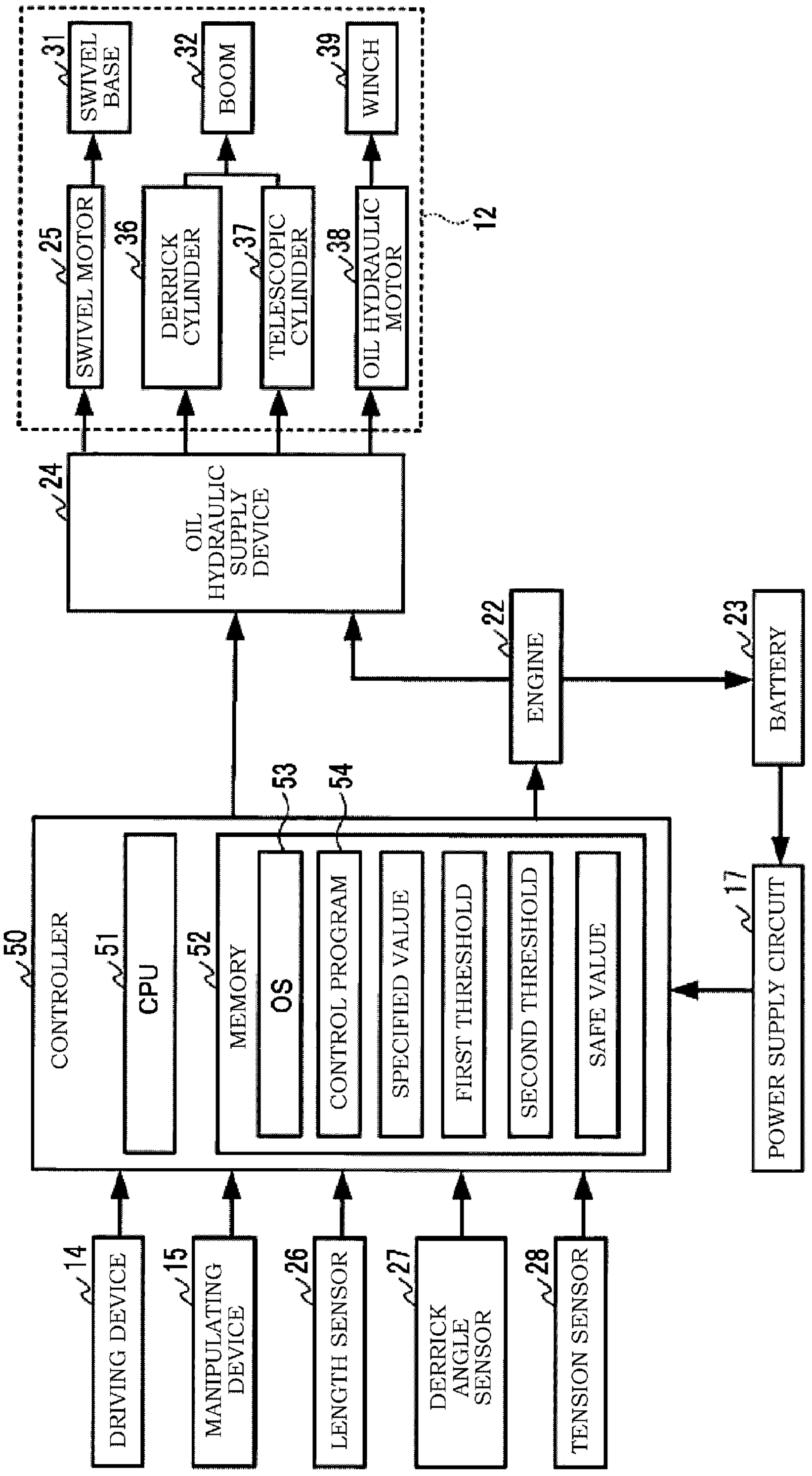

[Figure 4]
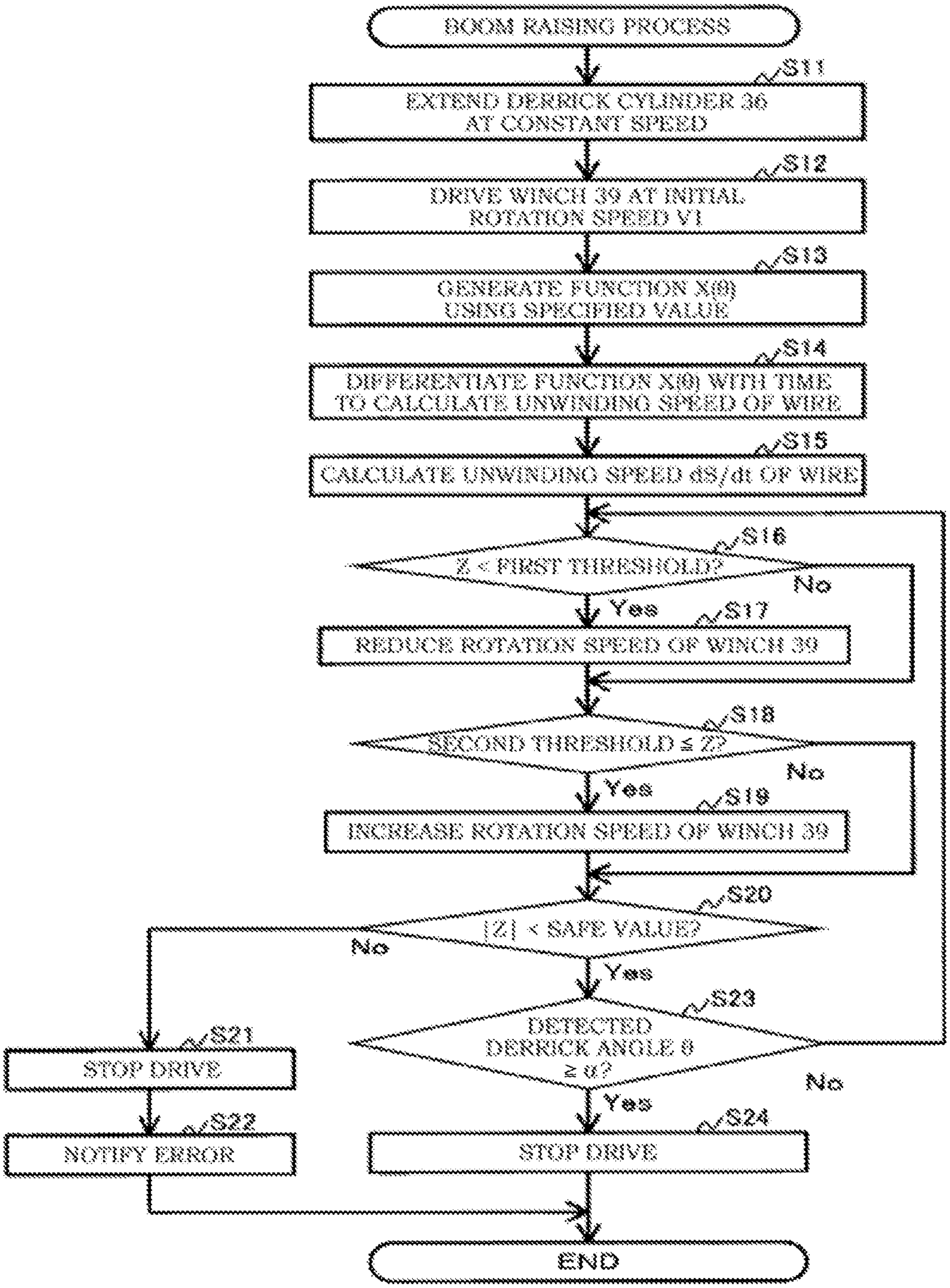

[Figure 5]
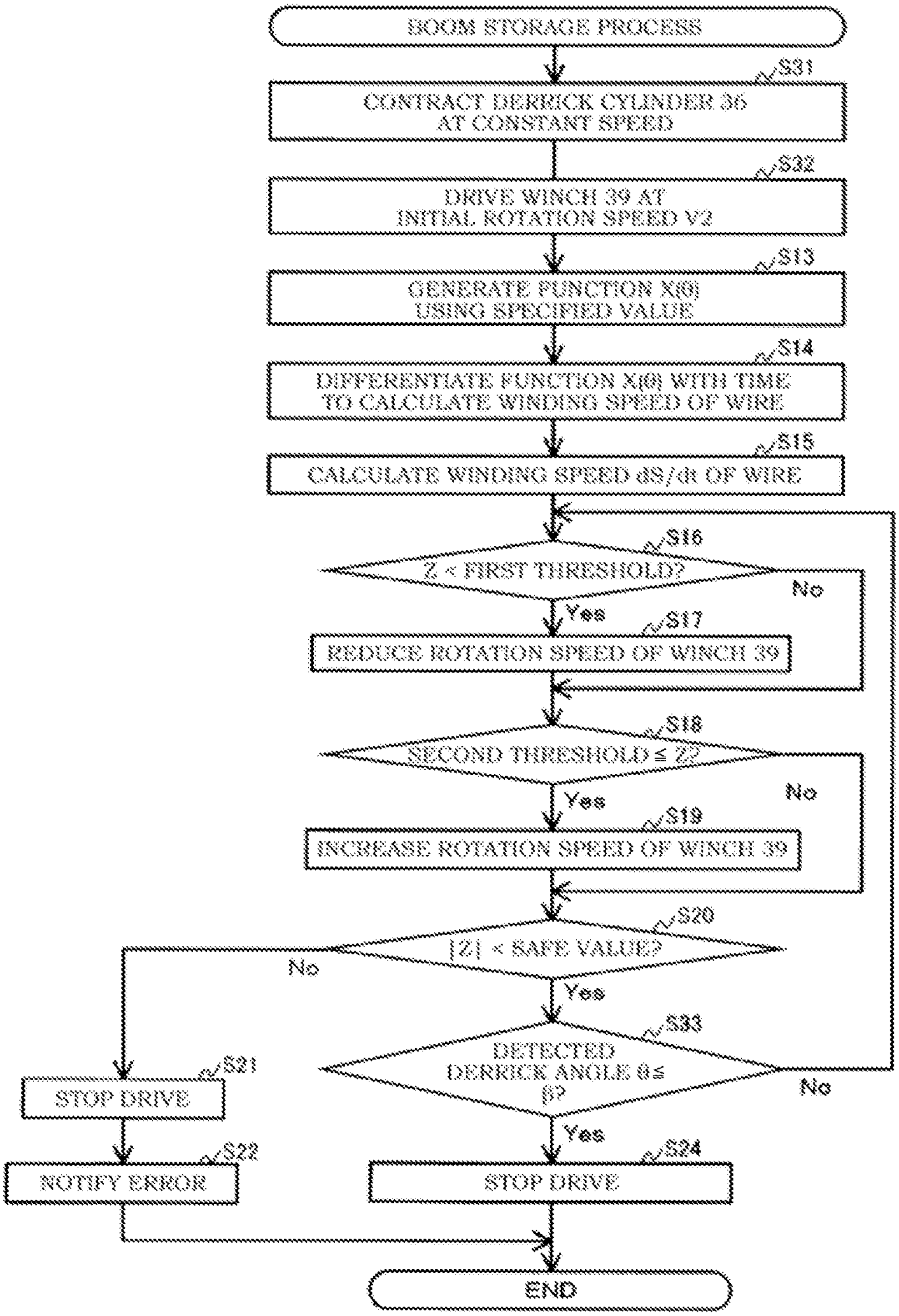

[Figure 6]
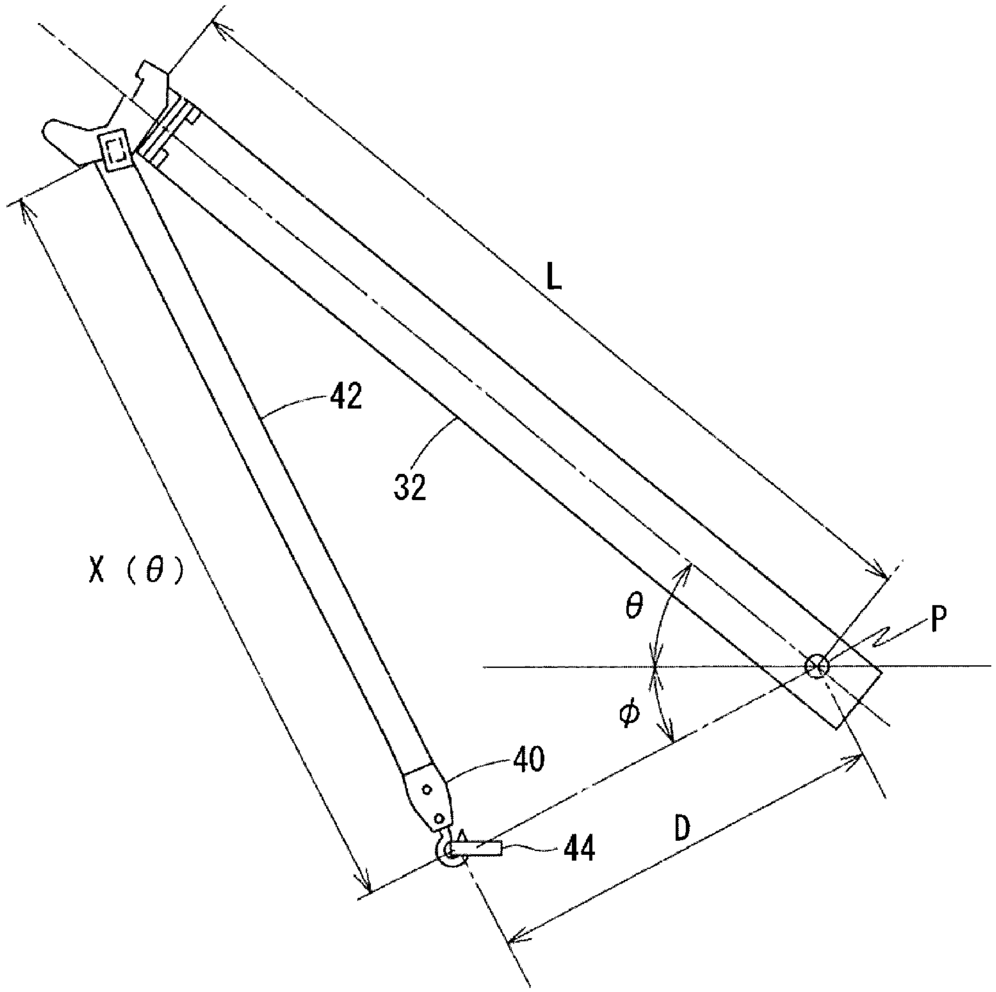
$$\text{FUNCTION } X(\theta) = \sqrt{L^2 + D^2 - 2D \cdot L\cos(\theta+\phi)}$$
$$\left|\frac{d}{dt}X(\theta)\right| = V(t) = \frac{D \cdot L\sin(\theta+\phi)}{\sqrt{L^2 + D^2 - 2D \cdot L\cos(\theta+\phi)}}\frac{d}{dt}\theta$$

[Figure 7]
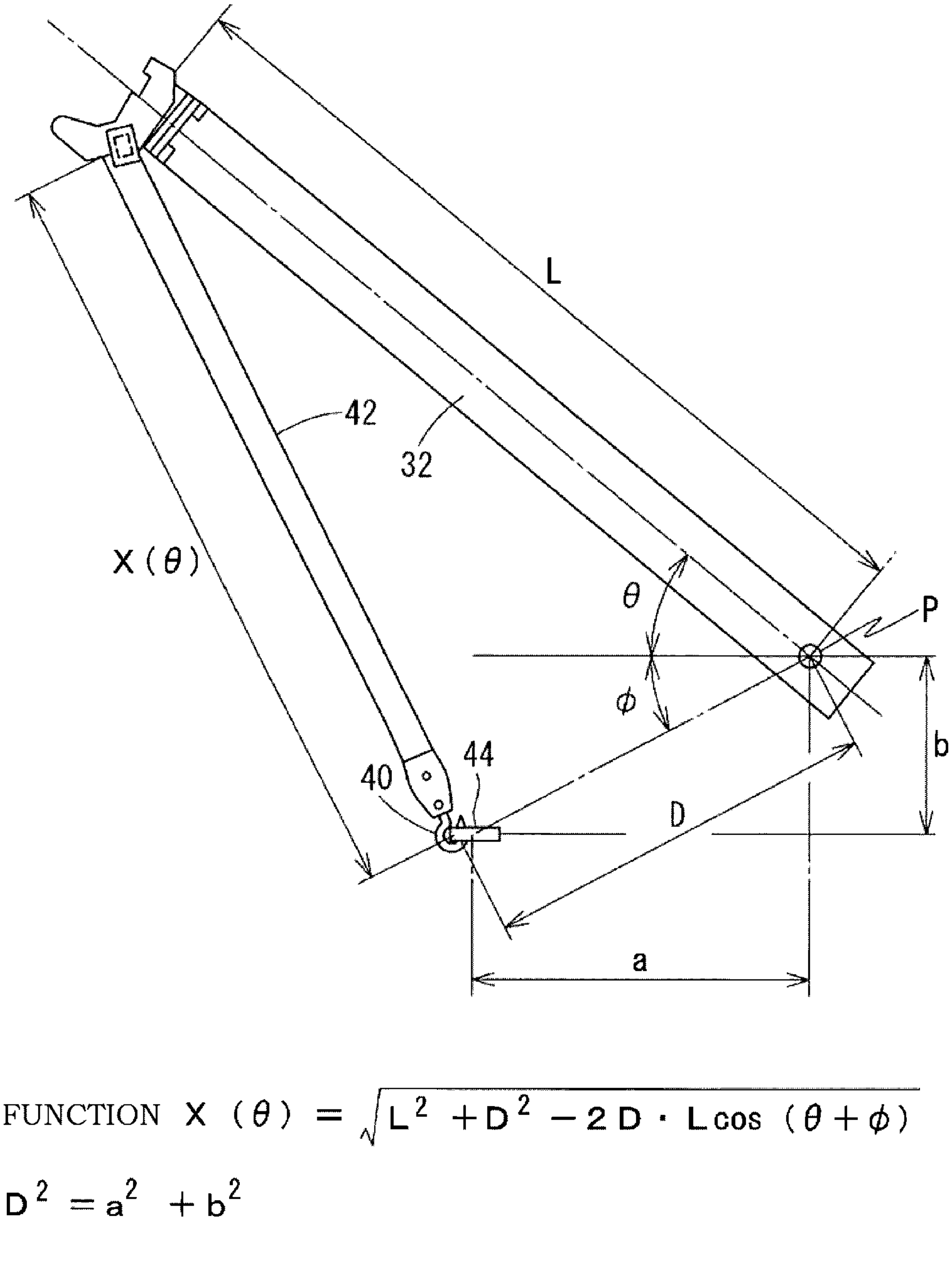
FUNCTION $X(\theta) = \sqrt{L^2 + D^2 - 2D \cdot L\cos(\theta + \phi)}$
$D^2 = a^2 + b^2$

CONTROLLER, BOOM DEVICE, AND CRANE VEHICLE

TECHNICAL FIELD

The present invention relates to a controller that controls a boom device including a boom and a winch, a boom device, and a crane vehicle mounted with the boom device.

BACKGROUND

A crane vehicle is generally mounted with a boom device (see Japanese Patent Laid-Open No. 7-172775). The boom device disclosed in Japanese Patent Laid-Open No. 7-172775 includes a telescopic boom, a boom drive unit, a winch having a wire drum around which a wire is wound, a winch drive unit, a load hook provided at a tip of the wire, and a hook fixing ring. The boom is supported by a swivel base such that the boom can be raised and lowered. The boom drive unit extends and retracts and raises and lowers the boom. The wire is pulled out from the wire drum and wound around a distal end of the boom, and the load hook is provided at an end of the wire. The winch drive unit drives the winch to wind the wire around the wire drum or to unwind the wire from the wire drum. The hook fixing ring is provided on the swivel base, and the load hook is hung on and fixed to the hook fixing ring during crane travelling (non-working time).

The boom device disclosed in Japanese Patent Laid-Open No. 7-172775 includes a control device that controls the boom drive unit and the winch drive unit in order to perform a safe boom storage operation at the end of work and a safe boom unfolding operation at the start of work. The control device controls the drive of the winch drive unit in the boom storage operation. Specifically, in the storage operation, an operator first retracts and raises the boom, and hangs the load hook on the hook fixing ring. Next, the operator operates a boom drive device to lower the boom. The control device winds up the wire while automatically controlling the winch drive unit according to the lowering of the boom so that the wire does not loosen.

The control device controls the drive of the winch based on a wire length S detected by a sensor for detecting a length of the wire and a derrick angle θ of the boom detected by a derrick angle sensor such that the wire length S and the derrick angle θ have an ideal correspondence D (the wire is not excessively loosened or stretched). The ideal correspondence D is obtained by experiments or simulation using an actual machine, and is stored in a storage unit in advance.

The ideal correspondence D varies depending on geometry constituted by a length of the boom in a retracted state, a position of the distal end around which the wire is wound, a derrick fulcrum position, a position of the hook fixing ring, and the like. In this case, the ideal correspondence D, which is unique to each type of boom devices, needs to be determined, and the control device needs to be designed for various boom devices.

Therefore, an object of the present invention is to provide a controller that can automatically store or raise a boom and can be commonly used for various boom devices.

SUMMARY OF THE DISCLOSURE (1) A controller according to the present invention is used for a boom device including a base, a boom supported by the base and capable of being raised and lowered between a lowered position and a raised position, a winch having a wire wound around a wire drum and wound around a distal end of the boom, a load hook provided at a tip of the wire, a first drive source configured to raise and lower the boom, a second drive source configured to drive the winch and to unwind the wire from the wire drum or wind the wire around the wire drum, an engaging member provided on the base and to which the load hook suspended from the distal end of the boom at the raised position is engaged in a detachable manner, a derrick angle sensor configured to detect a derrick angle of the boom, and a length sensor configured to detect an unwinding length of the wire from the distal end of the boom. The controller according to the present invention includes a memory configured to store specified values corresponding to a length of the boom and a position of the engaging member with respect to a derrick fulcrum of the boom. The controller according to the present invention calculates a displacement distance from the distal end of the boom to the engaging member based on the derrick angle of the boom detected by the derrick angle sensor and the specified values read out from the memory, and executes an automatic boom drive process of driving the winch while raising or lowering the boom between the lowered position and the raised position in a state where the load hook is engaged with the engaging member such that the displacement distance is a distance corresponding to the length detected by the length sensor, or a wire speed which is an unwinding speed or a winding speed of the wire is calculated based on the calculated displacement distance, and the calculated wire seed is a speed corresponding to a detected wire speed calculated based on a detected value of the length sensor.

By executing the automatic boom drive process, the controller can automatically perform a boom raising operation or a boom storage operation. Therefore, work of the operator is facilitated in the boom raising operation or the boom storage operation. Further, the controller calculates the displacement distance from the distal end of the boom to the engaging member, and drives the winch while raising and lowering the boom such that the calculated displacement distance is the distance corresponding to the length detected by the length sensor, or the wire speed calculated based on the calculated displacement distance is the speed corresponding to the detected wire speed calculated based on the detected value of the length sensor. Therefore, the controller can prevent the wire from being loosened, and can also prevent breakage and the like in the boom device. Furthermore, since the controller calculates the displacement distance from the distal end of the boom to the engaging member based on the specified values stored in the memory corresponding to the length of the boom and the position of the engaging member with respect to the derrick fulcrum of the boom, the specified values read out from the memory change depending on a type of the boom device, and the controller can be commonly used with various boom devices.

(2) The first drive source may be a telescopic cylinder. The controller according to the present invention keeps an extension and retraction speed of the cylinder constant in the automatic boom drive process.

Since the controller raises and lowers the boom while keeping the extension and retraction speed of the cylinder constant, a target for controlling the drive according to the displacement distance may be limited to the second drive source. Accordingly, the controller can easily control the boom device. Further, since the cylinder is extended and retracted at a constant speed, a derrick speed of the boom visible to the operator does not fluctuate little by little, which gives the operator a sense of security.

(3) The controller according to the present invention may keep an angular velocity of the boom that is raised and lowered constant in the automatic boom drive process.

Since the controller raises and lowers the boom while keeping the raising and lowering angular velocity of the boom constant, the target for controlling the drive according to the displacement distance may be limited to the second drive source. Accordingly, the controller can easily control the boom device. Further, since the angular velocity of the boom is constant, the operator can be given a sense of security as compared with the case where the angular velocity of the boom fluctuates little by little according to the displacement distance.

(4) The controller according to the present invention may keep a rotation speed of the winch constant in the automatic boom drive process.

Since the controller keeps the rotation speed of the winch constant, the target for controlling the drive according to the displacement distance may be limited to the first drive source. Accordingly, the controller can easily control the boom device.

(5) The boom device may further include a tension sensor configured to detect tension applied to the wire. The memory stores in advance a threshold for determining an allowable range of a difference between the displacement distance and the unwinding length of the wire detected by the length sensor. In the automatic boom drive process, the controller drives the winch while raising and lowering the boom between the lowered position and the raised position such that the difference between the displacement distance and the length detected by the length sensor is equal to or less than the threshold. The controller corrects the threshold according to a magnitude of the tension detected by the tension sensor.

For example, when the tension detected by the tension sensor is too large, the threshold is corrected so that the tension becomes small. When the tension detected by the tension sensor is too small, the threshold is corrected so that the threshold becomes large.

(6) The controller according to the present invention may further execute a determination process of determining whether the difference between the displacement distance and the unwinding length of the wire is within a safe value range, and may further execute a drive stop process of stopping the drive of the first drive source and the second drive source upon determining that the difference between the displacement distance and the unwinding length is not within the safe value range.

The controller stops the drive of the first drive source and the second drive source upon determining that the difference between the displacement distance and the unwinding length is not within the safe value range. That is, when a problem occurs in winding of the wire by the winch, raising and lowering of the boom and rotation of the winch are stopped. Accordingly, it is possible to prevent the boom device and the wire from being hindered.

(7) The specified values may be the length of the boom and a separation distance between the derrick fulcrum of the boom and the engaging member.

(8) The specified values may be the length of the boom, a first separation distance in a horizontal direction between the derrick fulcrum of the boom and the engaging member, and a second separation distance in a vertical direction between the derrick fulcrum of the boom and the engaging member.

(9) The memory may store a class that generates a function for calculating the displacement distance based on the derrick angle and the unwinding length of the wire. The controller according to the present invention generates the function based on the class by using the specified values read out from the memory.

The controller uses a class to generate a function. Therefore, the controller can easily generate a function corresponding to the type of the boom device.

(10) The present invention can also be regarded as a boom device provided with the above-mentioned controller.

(11) The present invention can also be regarded as a crane vehicle including a boom device provided with the above-mentioned controller and a traveling body mounted with the boom device.

According to the present invention, it is possible to provide a controller that can automatically store or raise a boom and can be commonly used for various boom devices.

BRIEF DESCRIPTION OF DRAWINGS

FIG. 1 is a schematic diagram of a crane vehicle 10 according to the present embodiment, showing a state where a boom 32 is at a storage position.

FIG. 2 is a diagram showing the crane vehicle 10 in a state where a boom 42 is at a raised position.

FIG. 3 is a functional block diagram of the crane vehicle 10.

FIG. 4 is a flowchart of a boom raising process.

FIG. 5 is a flowchart of a boom storage process.

FIG. 6 is an explanatory diagram illustrating a displacement distance X(θ).

FIG. 7 is another explanatory diagram illustrating the displacement distance X(θ).

DETAILED DESCRIPTION OF EMBODIMENTS

Hereinafter, a preferred embodiment of the present invention will be described with reference to the drawings as appropriate. Needless to say, the present embodiment is merely one aspect of the present invention, and the embodiments may be changed without changing the gist of the present invention.

FIG. 1 is a schematic diagram showing a crane vehicle 10 according to the present embodiment. The crane vehicle 10 mainly includes a traveling body 11, a boom device 12 mounted on the traveling body 11, and a cabin 13.

The traveling body 11 includes a vehicle body 20, axles 21, an engine 22 (FIG. 4), and a battery 23 (FIG. 4).

The vehicle body 20 rotatably supports the axles 21. Wheels are attached to both ends of the axles 21. The engine 22 rotates and drives the axles 21. The engine 22 charges the battery 23.

The engine 22 drives an oil hydraulic pump (not shown) included in an oil hydraulic supply device 24 described later. The oil hydraulic pump discharges operating oil at a predetermined pressure and drives a swivel motor 25, a derrick cylinder 36, a telescopic cylinder 37, and an oil hydraulic motor 38 that are shown in FIG. 4 and other actuators (hereinafter, also referred to as the swivel motor 25 and the like).

The vehicle body 20 is mounted with the oil hydraulic supply device 24 shown in FIG. 4. The oil hydraulic supply device 24 includes a solenoid valve and the like. The solenoid valve is opened and closed by a drive signal input from a controller 50 (FIG. 4) described later. The swivel motor 25 and the like are driven by opening and closing the solenoid valve. That is, the controller 50 controls the drive of the swivel motor 25 and the like by outputting a drive signal for opening and closing the solenoid valve. In the present embodiment, an example in which the swivel motor 25 and the like are oil hydraulic actuators is described, and all or a part of the swivel motor 25 and the like may be an electric actuator or the like.

As shown in FIG. 1, the cabin 13 is mounted on a swivel base 31 of the boom device 12. The cabin 13 includes a driving device 14 (FIG. 3) configured to drive the crane vehicle 10, and a manipulating device 15 (FIG. 3) configured to manipulate the boom device 12. That is, the crane vehicle 10 is a rough terrain crane, and driving of the crane vehicle 10 and manipulating of the boom device 12 are performed in one cabin 13. However, the crane vehicle 10 may be an all-terrain crane including two cabins, that is, a cabin including the driving device 14 and a cabin including the manipulating device 15.

The manipulating device 15 includes an operation lever, an operation button, and the like for operating the boom device 12. The manipulating device 15 outputs an operation signal indicating a direction and an amount of operation of the operation lever and an operation signal indicating whether the operation button is operated. The operation signal output by the manipulating device 15 is input to the controller 50 (FIG. 3).

The cabin 13 includes a control box (not shown). The control box includes a control board. The control board is mounted with a microcomputer, a resistor, a capacitor, a diode, and various ICs, and constitutes the controller 50 and a power supply circuit 17 shown in FIG. 3.

As shown in FIG. 1, the boom device 12 includes the swivel base 31 rotatably supported by the vehicle body 20 and a boom 32 supported by the swivel base 31. The boom 32 includes a proximal boom 33, one or more intermediate booms 34, and a distal boom 35. The proximal boom 33, the intermediate boom 34, and the distal boom 35 are arranged in a nested manner, and the boom 32 is telescopic. The proximal boom 33 is supported by the swivel base 31 such that the proximal boom 33 can be raised and lowered. That is, the boom 32 can be raised and lowered and is telescopic. The swivel base 31 corresponds to the "base" in the claims of the present invention.

The boom 32 is extended and retracted from a retracted state shown in FIG. 1 to an extended state (not shown). The boom 32 is raised and lowered from a lowered position shown in FIG. 1 to a raised position shown in FIG. 2. The crane vehicle 10 travels in a storage state where the boom 32 is in the retracted state and at the lowered position.

As shown in FIG. 3, the boom device 12 further includes the swivel motor 25, the derrick cylinder 36 configured to raise and lower the boom 32, and the telescopic cylinder 37 configured to extend and retract the boom 32.

The swivel motor 25 is provided on the vehicle body 20. The swivel motor 25 is rotated by being supplied with the operating oil from the oil hydraulic supply device 24 so as to swivel the swivel base 31.

The derrick cylinder 36 is provided on the swivel base 31. The telescopic cylinder 37 is provided on the boom 32. The derrick cylinder 36 and the telescopic cylinder 37 are extended and retracted by being supplied with the operating oil from the oil hydraulic supply device 24. The derrick cylinder 36 that is extended and retracted raises and lowers the boom 32. The telescopic cylinder 37 that is extended and retracted extends and retracts the boom 32. A swivel joint (not shown) is provided between the vehicle body 20 and the swivel base 31. The oil hydraulic supply device 24 provided on the vehicle body 20 supplies the operating oil to the derrick cylinder 36 and the telescopic cylinder 37 via the swivel joint. The derrick cylinder 36 corresponds to the "first drive source" and the "cylinder" in the claims of the present invention.

The boom device 12 further includes the oil hydraulic motor 38, a winch 39, a load hook 40, and an engaging member 41. The oil hydraulic motor 38 is rotated by being supplied with the operating oil from the oil hydraulic supply device 24 via the swivel joint. A rotation speed of the oil hydraulic motor 38 is controlled by the controller 50. The rotating oil hydraulic motor 38 rotates a wire drum 29 of the winch 39. The rotating wire drum 29 winds up a wire 42 or unwinds the wire 42. The oil hydraulic motor 38 corresponds to the "second drive source" in the claims of the present invention.

The wire 42 is connected to the load hook 40. The load hook 40 is suspended by the wire 42 from a distal end of the boom 32. The load hook 40 rises and falls as the winch 39 rotates.

The engaging member 41 is a member that engages with the load hook 40 to fix the load hook 40. The engaging member 41 is fixed to the swivel base 31. The engaging member 41 is located right below the distal end of the boom 32 at the raised position and in the retracted state. The engaging member 41 fixes the load hook 40 such that the load hook 40 does not move while the crane vehicle 10 is traveling.

The boom 32 further includes a length sensor 26 configured to detect an unwinding length of the wire 42, and a derrick angle sensor 27 configured to detect a derrick angle of the boom 32. A tension sensor 28 shown in FIG. 3 will be described in a modified example.

The length sensor 26 and the derrick angle sensor 27 are used for a boom raising process and a boom storage process which will be described later.

The length sensor 26 is, for example, a rotary encoder configured to detect an amount of rotation of the winch 39. The length sensor 26 outputs a pulse signal whose voltage value changes according to rotation of the winch 39. The length sensor 26 is connected to the controller 50 by a signal line such as a cable. The controller 50 calculates the unwinding length of the wire 42 based on the number of pulses input from the length sensor 26. However, any kind of sensor may be used for the length sensor 26 as long as the sensor can detect the unwinding length of the wire 42.

Existing optical or magnetic sensors that output a voltage value corresponding to the derrick angle of the boom 32 and rotary encoders are used as the derrick angle sensor 27. The derrick angle sensor 27 is connected to the controller 50 by a signal line such as a cable. The controller 50 calculates the derrick angle of the boom 32 based on a signal voltage output by the derrick angle sensor 27. For example, the controller 50 calculates the derrick angle of the boom 32 with reference to a position of the boom 32 at a storage position. In the following, the derrick angle of the boom 32 calculated by the controller 50 is also referred to as a "detected derrick angle".

The power supply circuit 17 is a circuit configured to generate electric power to be supplied to the controller 50 and the like. The power supply circuit 17 is, for example, a DC-DC converter. The power supply circuit 17 converts a DC voltage supplied from the battery 23 into a DC voltage having a predetermined stable voltage value and outputs the DC voltage.

The controller 50 includes a central processing unit 51 (CPU) and a memory 52. The memory 52 includes, for example, a ROM, a RAM, an EEPROM and the like.

The memory 52 stores an operating system 53 (OS), a control program 54 for controlling the drive of the boom device 12, specified values, a first threshold, a second threshold, and a safe value. The OS 53 and the control program 54 are executed by the CPU 51 in a pseudo-parallel manner by a multi-task process.

The specified values refer to "L", "D", and "φ" shown in FIG. 6. "L" is the length of the boom 32 from a proximal end to the distal end. The proximal end of the boom 32 is a position of the derrick fulcrum P of the boom 32. The distal end of the boom is, for example, a mounting position of a member around which the wire 42 is wound. "D" is a distance from the derrick fulcrum P of the boom 32 to the load hook 40. "φ" is a depression angle of the load hook 40 with respect to the derrick fulcrum P of the boom 32. The specified values are stored in the memory 52 in advance according to the type of the boom device 12. "D" corresponds to the "separation distance" in the claims of the present invention.

The first threshold, the second threshold, and the safe value are used for a determination process in the boom raising process and the boom storage process which will be described later. Details will be described later. The first threshold and the second threshold correspond to the "threshold" in the claims of the present invention.

The CPU 51, the memory 52, the above-mentioned length sensor 26, the derrick angle sensor 27, and the like are connected to a communication bus (not shown). The control program 54 executed by the CPU 51 reads a function, the first threshold, and the second threshold from the memory 52 through the communication bus, receives a detected signal output from the length sensor 26 and the derrick angle sensor 27, and writes and stores information and data in the memory 52.

The control program 54 has a class. That is, the class is stored in the memory 52. The class creates an instance (object). Specifically, the class generates a function X(θ) as an instance by being given the specified values stored in the memory 52. The function X(θ) is a calculation formula for calculating a displacement distance X(θ) {θ: detected derrick angle}, which is a distance from the distal end of the boom 32 to the load hook 40, using the detected derrick angle θ of the boom 32. The control program 54 feedback-controls the drive of the boom device 12 such that a difference between the displacement distance X(θ) and an unwinding length S of the wire 42 detected by the sensor 26 is equal to or larger than the first threshold and less than the second threshold. Details will be described later. The method for generating the function X(θ) is not limited to those using a class. Other methods may be used as long as the method can generate the function X(θ) based on the specified values.

The control program 54 is a program for executing the boom raising process of automatically raising the boom 32 stored in the storage state (FIG. 1) to the raised position (FIG. 2) and the boom storage process of automatically lowering the boom 32 at the raised position to the storage state to storage the boom 32. The boom raising process is an example of an automatic boom drive process. The boom storage process is an example of the automatic boom drive process.

More specifically, after the crane vehicle 10 arrives at a work site, an operator makes the control program 54 execute the boom raising process. That is, the boom raising process is a process executed for the crane vehicle 10 to start a work at the work site.

The operator makes the control program 54 execute the boom storage process so that the crane vehicle 10 travels away from the work site. That is, the boom storage process is a process executed for the crane vehicle 10 to complete the work at the work site.

The boom raising process is a process in which the control program 54 automatically performs a raising operation of the boom 32, which has been manually performed by the operator using the manipulating device 15. The boom storage process is a process in which the control program 54 automatically performs a storage operation of the boom 32, which has been manually performed by the operator using the manipulating device 15. Hereinafter, the boom raising process and the boom storage process will be described in detail with reference to FIGS. 4 and 5. An execution order of steps executed by the control program 54 in the boom raising process and the boom storage process may be changed as long as the execution order does not change the gist of the present invention.

After the crane vehicle 10 arrives at the work site, the operator uses the manipulating device 15 to perform an operation instructing execution of the boom raising process. As shown in FIG. 1, when the crane vehicle 10 arrives at the work site, the boom 32 is retracted and lowered down, and the load hook 40 is fixed to the engaging member 41. The boom raising process is executed with the load hook 40 fixed to the engaging member 41 such that the load hook 40 does not move in the boom raising process.

The control program 54 starts to execute the boom raising process shown in FIG. 4 in response to input of an operation signal instructing the execution of the boom raising process from the manipulating device 15. First, the control program 54 extends the derrick cylinder 36 at a constant speed (S11). Alternatively, the control program 54 extends the derrick cylinder 36 such that the boom 32 is raised at a constant angular velocity (dθ/dt=constant). More specifically, the control is more complicated if the control program 54 has two drive systems to be subjected to feedback control. The control program 54 extends the derrick cylinder 36 at a constant speed or a constant angular velocity for ease of control. The boom 32 is gradually raised as the derrick cylinder 36 is extended at a constant speed or a constant angular velocity.

Next, the control program 54 rotationally drives the winch 39 at an initial rotation speed V1 (S12). The direction of rotation of the winch 39 is a direction to which the wire 42 is unwound. That is, the wire 42 is gradually unwound while the boom 32 is gradually raised.

Next, the control program 54 reads the specified values L, D, and φ from the memory 52, and uses the read specified values and the class stored in the memory 52 to generate the function X(θ) that is an instance (S13). Then, the control program 54 differentiates the generated function X(θ) with respect to a time t, and calculates a time change of the function X (θ), that is, a unwinding speed V(t) of the wire 42. The differentiation of the function X(θ) may be performed by a differentiating circuit using an operational amplifier.

FIG. 6 shows d(X(θ))/dt obtained by differentiating the function X(θ) with respect to the time t. "de/dt" in the figure is a time change of the derrick angle θ of the boom 32, that is, the angular velocity of the boom 32. When the control program 54 raises the boom 32 at a constant angular velocity, "de/dt" in the figure is a constant. The constant "de/dt" is stored in the memory 52 in advance. Further, when the control program 54 extends the derrick cylinder 36 at a constant speed, "de/dt" is stored in the memory 52 in advance or calculated by the control program 54. The control program 54 calculates the unwinding speed V(t) of the wire 42 by using the calculated "de/dt" or "de/dt" stored in the memory 52.

Next, the control program 54 calculates an unwinding speed dS/dt of the wire 42 based on the detected signal input from the length sensor 26 (S15). For example, the control program 54 acquires the detected signals output by the length sensor 26 per unit time, and calculates a differential in the lengths of the wire 42 indicated by the acquired detected signals. The differential is the length of the wire 42 per unit time, that is, the unwinding speed dS/dt of the wire 42. The control program 53 calculates the actual unwinding speed dS/dt of the wire 42 by calculating the above-mentioned differential.

Then, the control program 54 calculates a difference Z="V(t)−dS/dt" between the unwinding speed V(t) of the wire 42 calculated as a calculated value and the actual unwinding speed dS/dt of the wire 42, and determines whether the calculated Z is less than the first threshold (S16). That is, in step S16, whether the unwinding speed of the wire 42 is too high is determined.

If the control program 54 determines that Z is less than the first threshold (S16: Yes), that is, it determines that the unwinding speed of the wire 42 is too high, the control program 54 reduces a rotation speed of the winch 39 (S17). Specifically, the control program 54 reduces the rotation speed of the oil hydraulic motor 38 from the initial value V1 according to the magnitude of the value of Z. In contrast, if the control program 54 determines that Z is equal to or larger than the first threshold (S16: No), the control program 54 skips the process of step S17.

Next, the control program 54 determines whether the value of Z is equal to or larger than the second threshold (S18). That is, in step S18, whether the unwinding speed of the wire 42 is too low is determined.

If the control program 54 determines that the value of Z is equal to or larger than the second threshold (S18: Yes), that is, it determines that the unwinding speed of the wire 42 is too low, the control program 54 increases the rotation speed of the winch 39 (S19). Specifically, the control program 54 increases the rotation speed of the oil hydraulic motor 38 from the initial value V1 according to the magnitude of the value of Z. In contrast, if the control program 54 determines that the value of Z is less than the second threshold (S18: No), the control program 54 skips the process of step S19.

The first threshold and the second threshold are set to values such that a tension T applied to the wire 42 is less than a predetermined value and the wire 42 does not loosen in the process in which the wire 42 is gradually unwound while the boom 32 is gradually raised. That is, the control program 54 feedback-controls the derrick cylinder 36 and the oil hydraulic motor 38 such that the tension T applied to the wire 42 is less than the predetermined value and the wire 42 does not loosen.

Next, the control program 54 determines whether an absolute value of Z is less than the safe value stored in the memory 52 (S20). The safe value is a value larger than the first threshold and the second threshold. That is, in step S20, it is determined in the winch 39 whether a problem has occurred in the unwinding of the wire 42 or whether a problem has occurred in the rotation of the winch 39. The process of step S20 corresponds to the "determination process" in the claims of the present invention.

If the control program 54 determines that the absolute value of Z is equal to or larger than the safe value stored in the memory 52 (S20: No), the control program 54 stops driving the derrick cylinder 36 and the oil hydraulic motor 38 (S21). That is, the control program 54 stops the boom 32 and the winch 39. Then, the control program 54 executes a notification process (S22). For example, the control program 54 makes a speaker output a warning sound, or makes a monitor provided in the manipulating device 15 display a warning screen. The process of step S21 corresponds to the "drive stop process" in the claims of the present invention.

Next, the control program 54 determines whether the detected derrick angle θ is equal to or larger than α (S23). α is a value of θ when the boom 32 is at the raised position, and is stored in the memory 52 in advance. That is, in step S23, it is determined whether the boom 32 has arrived at the raised position. The control program 54 repeatedly executes the processes from step S16 to step S20 until the boom 32 arrives at the raised position and the detected derrick angle θ has reached α (S23: No).

If the control program 54 determines that the boom 32 has arrived at the raised position and the detected derrick angle θ has reached α (S23: Yes), the control program 54 stops the drive of the derrick cylinder 36 and the oil hydraulic motor 38 (S24), and ends the boom raising process.

Next, the boom storage process will be described with reference to FIG. 5. The same process as the boom raising process is given the same step number as the step number associated with the boom raising process, and the description thereof is omitted.

When the operator finishes the work of the crane vehicle 10, the operator first uses the manipulating device 15 to make the boom 32 in the retracted state and make the boom 32 at the raised position as shown in FIG. 2. Then, the operator engages the load hook 40 with the engaging member 41 to fix the load hook 40 with the engaging member 41. After that, the operator uses the manipulating device 15 to perform an operation instructing the execution of the boom storage process.

The control program 54 starts to execute the boom storage process shown in FIG. 5 in response to input of an operation signal instructing the execution of the boom storage process from the manipulating device 15. First, the control program 54 retracts the derrick cylinder 36 at a constant speed (S31). As the derrick cylinder 36 is retracted at a constant speed, the boom 32 is gradually lowered.

Next, the control program 54 rotationally drives the winch 39 at an initial rotation speed V2 (S32). The direction of rotation of the winch 38 is a direction to which the wire 42 is wound up. That is, the wire 42 is gradually wound up while the boom 32 is gradually lowered. The initial rotation speed V2 may be the same as the initial rotation speed V1 or different from the initial rotation speed V1.

Next, the control program 54 executes processes from steps S13 to S22 in the same manner as the boom raising process. That is, the control program 54 performs feedback control to gradually lower the boom 32 and to gradually wind up the wire 42 in a manner such that the tension T applied to the wire 42 is less than a predetermined value and the wire 42 does not loosen.

Next, the control program 54 determines whether the detected derrick angle θ is equal to or less than β (S33). β is a value of 0 when the boom 32 is at the lowered position, and is stored in the memory 52 in advance. β is, for example, "0". That is, in step S33, it is determined whether the boom 32 has arrived at the lowered position. The control program 54 repeatedly executes the processes from steps S16 to S20 until the boom 32 arrives at the lowered position and the detected derrick angle θ reaches β (S33: No).

If the control program 54 determines that the boom 32 has arrived at the lowered position and the detected derrick angle θ has reached β (S33: Yes), the control program 54 stops the drive of the derrick cylinder 36 and the oil hydraulic motor 38 (S24), and ends the boom storage process.

Operation and Effect of Embodiment

In the present embodiment, the control program 54 executes the boom raising process and the boom storage process, so that the raising operation of the boom 32 and the storage operation of the boom 32 can be automatically performed. Therefore, the work of the operator is facilitated in the raising operation of the boom 32 and the storage operation of the boom 32, and it is possible to prevent "irregular winding" in the winch 39, and further, it is possible to prevent the boom device 12 from being damaged. More specifically, the operator must operate two operating targets, the boom 32 and the winch 39 when manually performing the raising operation of the boom 32 and the storage operation of the boom 32. That is, the operator operates the winch 39 while the raising and lowering the boom 32 and monitoring a tension state of the wire 42. The operation requires the mastery skill of the operator. If the operator makes a mistake in the operation, excessive tension acts on the wire 42, which may damage the engaging member 41 and the winch 39. Further, if the operator makes a mistake in the operation, the wire 42 may loosen, causing the "irregular winding" in the winch 39. In the present embodiment, the control program 54 executes the boom raising process and the boom storage process, so that the work of the operator is facilitated, and it is possible to prevent the "irregular winding" from occurring in the winch 39, and further, it is possible to prevent the boom device 12 from being damaged.

The control program 54 generates the function X(θ) using the specified values stored in the memory 52, and calculates the displacement distance X(θ) {θ: detected derrick angle} from the distal end of the boom 32 to the engaging member 41 using the generated function (θ). Then, the control program 54 performs feedback control using the calculated displacement distance X(θ). Therefore, since the specified values read out from the memory 52 are changed depending on the type of the boom device 12, the controller 50 can be commonly used with various boom devices 12. Accordingly, the controller 50 with high versatility can be realized.

In the present embodiment, since the control program 54 extends and retracts the derrick cylinder 36 at a constant speed (S11 and S31), the target of feedback control may be limited to the oil hydraulic motor 38 of the winch 39. Accordingly, the control program 54 can easily control the boom device 12. Further, in the boom 32 which is visible to the operator, if a derrick speed fluctuates little by little, the operator may be anxious. In the present embodiment, since the derrick cylinder 36 is extended and retracted at a constant speed, the derrick speed of the boom 32 does not fluctuate little by little, which gives the operator a sense of security.

In the present embodiment, the control program 54 stops the boom 32 and the winch 39 upon determining that the absolute value of the difference between the displacement distance X(θ) and the unwinding length S of the wire 42 is equal to or larger than the safe value. Therefore, it is possible to prevent the boom device 12 from failing or the wire 42 from being damaged.

In the present embodiment, the control program 54 generates the function X(θ) using the specified values L, D, and φ read out from the memory 52, and the class, and calculates the displacement distance X(θ) {θ: detected derrick angle} using the generated function X(θ). Therefore, in step S14, the displacement distance X(θ) can be calculated without reading the specified values L, D, and φ from the memory 52. Therefore, the number of times of reading the specified values L, D, and φ from the memory 52 can be reduced. Accordingly, the speed of processes from steps S14 to S19 is increased. Since the speed of the processes is increased, the feedback control can be performed in a period shorter than the case when the specified values L, D, and φ are sequentially read out from the memory 52 to calculate the displacement distance X(θ). Accordingly, it is possible to further prevent the "irregular winding" from occurring in the winch 39, and further prevent the boom device 12 from being damaged.

[Modification]

In the present modification, an example in which the tension T applied to the wire 42 is detected and the first threshold and the second threshold are corrected based on the detected tension T will be described.

The boom device 12 further includes the tension sensor 28 as shown in FIG. 3. The tension sensor 28 is a sensor configured to output a detected signal of the voltage value corresponding to the tension T applied to the wire 42. The tension sensor 28 is, for example, a load cell.

The tension sensor 28 is connected to the controller 50 by a signal line such as a cable. The detected signal output by the tension sensor 28 is input to the controller 50. The controller 50 determines the tension T applied to the wire 42 by the detected signal input from the tension sensor 28. Then, the controller 50 corrects or re-determines the first threshold and the second threshold stored in the memory 52 based on the determined tension T. Specifically, the memory 52 stores in advance a correction formula for correcting the first threshold and the second threshold from the tension T, or a correspondence table in which the tension T is associated with the first threshold and the tension T is associated with the second threshold. The controller 50 corrects or re-determines the first threshold and the second threshold by using the determined tension T and the above-mentioned correction formula, or by using the determined tension T and the above-mentioned correspondence table. Re-determination of the first threshold and the second threshold is also included in the correction of the first threshold and the second threshold.

For example, when the tension T detected by the tension sensor 28 is larger than a first determination value stored in the memory 52, the second threshold is corrected or re-determined so that the second threshold becomes small. The tension T applied to the wire 42 decreases when the second threshold becomes small. Further, when the tension T detected by the tension sensor 28 is smaller than a second determination value stored in the memory 52 and the wire 42 is not sufficiently stretched, the first threshold is corrected or re-determined so that the first threshold becomes large. The wire 42 is stretched with an appropriate tension T when the first threshold becomes large.

The controller 50 executes the determination processes of step S16 and step S18 by using the corrected or re-determined first threshold and second threshold. Other processes are the same as those of the embodiment.

[Operation and Effect of Modification]

In the present modification, the magnitude of the tension T applied to the wire 42 can be controlled more appropriately by correcting the first threshold and the second threshold by the tension of the wire 42 detected by the tension sensor 28.

[Other Modifications]

In the above-mentioned embodiment, an example in which the specified values are "L", "D", and "φ" has been described. However, the specified values are not limited to "L", "D", and "φ". The specified values may be "L", "φ", "a", and "b" as shown in FIG. 7. The specified value "D" can be replaced with the specified values "a" and "b". Specifically, "D" can be replaced with "a" and "b" as "D squared"="a squared"+"b squared". "a" corresponds to the "first separation distance" in the claims of the present invention. "b" corresponds to the "second separation distance" in the claims of the present invention.

In the above-mentioned embodiment and modifications, an example in which "φ" is included in the specified values has been described. However, "φ" can be excluded from the specified values with the derrick angle θ used as an elevation angle from the engaging member 42. That is, "T" is excluded from the specified values with θ+φ used as a new θ.

In the above-mentioned embodiment, an example in which the derrick cylinder 36 is extended and retracted at a constant speed in steps S11 and S31 has been described. However, the drive of the derrick cylinder 36 may be controlled such that the boom 32 is raised and lowered at a constant speed.

In the above-mentioned embodiment, an example in which the derrick cylinder 36 is extended and retracted at a constant speed and the oil hydraulic motor 38 of the winch 39 is feedback-controlled has been described. However, the winch 39 may be rotated at a constant rotation speed, and the derrick cylinder 36 of the boom 32 may be feedback-controlled.

In the above-mentioned embodiment, an example in which the drive of the winch 39 is feedback-controlled such that the difference Z between the unwinding speed of the wire 42 and the actual unwinding speed of the wire 42 detected by the length sensor 26 is within a range indicated by the second threshold has been described. However, the drive of the winch 39 may be feedback-controlled such that the difference between the unwinding length of the wire 42 and the actual unwinding length of the wire 42 detected by the length sensor 26 is within the threshold range. Also in this case, it is possible to prevent the "irregular winding" from occurring in the winch 39, and further prevent the boom device 12 from being damaged.

The invention claimed is:

1. A controller used for a boom device, the boom device including:

a base;

a boom supported by the base and capable of being raised and lowered between a lowered position and a raised position;

a winch having a wire wound around a wire drum and wound around a distal end of the boom;

a load hook provided at a tip of the wire;

a first drive source configured to raise and lower the boom;

a second drive source configured to drive the winch and to unwind the wire from the wire drum or wind the wire around the wire drum;

an engaging member provided on the base and to which the load hook suspended from the distal end of the boom at the raised position is engaged in a detachable manner;

a derrick angle sensor configured to detect a derrick angle of the boom; and a length sensor configured to detect an unwinding length of the wire from the distal end of the boom;

the controller comprising:

a memory configured to store specified values corresponding to a length of the boom and a position of the engaging member with respect to a derrick fulcrum of the boom; and the controller executes an automatic boom drive process of driving the winch while raising or lowering the boom between the lowered position and the raising position in a state where the load hook is engaged with the engaging member based on derrick angle of the boom detected by the derrick angle sensor and based on the specified values read out from the memory, and wherein in the automatic boom drive process of driving, the controller calculates the displacement distance from the distal end of the boom to the engaging member, and matches the displacement distance to a distance corresponding to the length detected by the length sensor, or the controller further calculates the wire speed which is an unwinding speed or a winding speed of wire based on the displacement distance and matches the calculated wire speed to a speed corresponding to a detected wire speed calculated based on a detected value of the length sensor, wherein each of the specified values relates to the unwinding length by a function X(θ, specified value), where X is the unwinding length, θ is the boom derrick angle, and specified value is (D, L, φ) or (a, b, L, φ), where D is a distance from the derrick fulcrum P of the boom to the load hook, L is a length from a proximal end of the boom to a distal end of the boom, φ is a depression angle of the load hook, a is a first separation distance in a horizontal direction between the derrick fulcrum of the boom and the engaging member, and b is a second separation distance in a vertical direction between the derrick fulcrum of the boom and the engaging member.

2. The controller according to claim 1, wherein:

the first drive source is a telescopic cylinder, and an extension and retraction speed of the cylinder is kept constant in the automatic boom drive process.

3. The controller according to claim 1, wherein an angular velocity of the boom that is raised and lowered is kept constant in the automatic boom drive process.

4. The controller according to claim 1, wherein a rotation speed of the winch is kept constant in the automatic boom drive process.

5. The controller according to claim 1, wherein:

the boom device further includes a tension sensor configured to detect tension applied to the wire, the memory stores in advance a threshold for determining an allowable range of a difference between the displacement distance and the unwinding length of the wire detected by the length sensor, in the automatic boom drive process, the controller drives the winch while raising and lowering the boom between the lowered position and the raised position such that the difference between the displacement distance and the length detected by the length sensor is within the threshold range, and the controller corrects the threshold according to a magnitude of the tension detected by the tension sensor.

6. The controller according to claim 1, wherein:

the controller executes a determination process of determining whether the difference between the displacement distance and the unwinding length of the wire is within a safe value range, and the controller further executes a drive stop process of stopping the drive of the first drive source and the second drive source in response to determination that the difference between the displacement distance and the unwinding length is not within the safe value range.

7. The controller according to claim 1, wherein the specified values include:

the length of the boom, and a separation distance between the derrick fulcrum of the boom and the engaging member.

8. The controller according to claim 1, wherein the specified values include:

the length of the boom, a first separation distance in a horizontal direction between the derrick fulcrum of the boom and the engaging member, and a second separation distance in a vertical direction between the derrick fulcrum of the boom and the engaging member.

9. The controller according to claim 1, wherein:

the memory stores a class that generates a function for calculating the displacement distance based on the derrick angle and the unwinding length of the wire, and the controller generates the function based on the class by using the specified values read out from the memory.

10. A boom device comprising:

the controller according to claim 1.

11. A crane vehicle comprising:

the boom device according to claim 10; and a traveling body mounted with the boom device.

* * * * *